(12) United States Patent
Jansen et al.

(10) Patent No.: US 8,039,559 B2
(45) Date of Patent: Oct. 18, 2011

(54) UNSATURATED POLYESTER RESIN OR VINYL ESTER RESIN COMPOSITIONS

(75) Inventors: Johan Franz Gradus Antonius Jansen, Geleen (NL); Ronald Ivo Kraeger, Baarn (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 12/307,479

(22) PCT Filed: Jul. 5, 2007

(86) PCT No.: PCT/EP2007/005957
§ 371 (c)(1),
(2), (4) Date: Oct. 2, 2009

(87) PCT Pub. No.: WO2008/003492
PCT Pub. Date: Jan. 10, 2008

(65) Prior Publication Data
US 2010/0048824 A1     Feb. 25, 2010

(30) Foreign Application Priority Data

Jul. 6, 2006 (EP) .................................. 06014028

(51) Int. Cl.
*C08F 20/00* (2006.01)
(52) U.S. Cl. ........ 525/445; 524/781; 524/783; 524/785; 525/437; 525/447; 525/530; 525/531; 528/306; 528/405
(58) Field of Classification Search .................. 525/437, 525/445, 447, 530, 531; 524/81, 783, 785; 528/306, 405
See application file for complete search history.

(56) References Cited

U.S. PATENT DOCUMENTS

| | | | | |
|---|---|---|---|---|
| 3,584,076 A | * | 6/1971 | Chetakian et al. | 525/17 |
| 4,518,283 A | * | 5/1985 | Gebauer et al. | 405/259.5 |
| 6,194,525 B1 | * | 2/2001 | Ortiz et al. | 525/42 |
| 2002/0173593 A1 | * | 11/2002 | Udding et al. | 525/312 |
| 2003/0083443 A1 | * | 5/2003 | Santobianco et al. | 525/530 |
| 2004/0068044 A1 | * | 4/2004 | Udding et al. | 524/556 |

FOREIGN PATENT DOCUMENTS

| | | |
|---|---|---|
| EP | 1 705 215 | 9/2006 |
| EP | 1 705 216 | 9/2006 |
| WO | WO 2005/047364 | 5/2005 |
| WO | WO 2005/047379 | 5/2005 |

OTHER PUBLICATIONS

International Search Report for PCT/EP2007/005957, mailed Sep. 24, 2007.
Written Opinion of the International Searching Authority for PCT/EP2007/005957, mailed Sep. 24, 2007.
Database WPI Week 199727, (1997), 1 page & JP 09-110949 (Apr. 28, 1997).
Database CA [Online], "Crosslinking catalysts for unsaturated polyesters", Chemical Abstracts Service, (May 12, 1984), 3 pages, Accession No. 1983:108346 & JP 57-147509 (Sep. 11, 1982).

* cited by examiner

*Primary Examiner* — David W Wu
*Assistant Examiner* — Robert Jones, Jr.
(74) *Attorney, Agent, or Firm* — Nixon & Vanderhye P.C.

(57) ABSTRACT

The present invention relates to a two-component composition comprising a first component and a second component, wherein the first component being a non-aqueous resin composition comprising an unsaturated polyester resin or vinyl ester resin, a transition metal compound selected from a copper, iron, manganese or titanium compound, a potassium compound, and the resin composition contains less than 0.01 mmol cobalt per kg primary resin system and less than 0.01 mmol vanadium per kg primary resin system; and the second component comprises a peroxide compound.

29 Claims, No Drawings

UNSATURATED POLYESTER RESIN OR VINYL ESTER RESIN COMPOSITIONS

This application is the U.S. national phase of International Application No. PCT/EP2007/005957, filed 5 Jul. 2007, which designated the U.S. and claims priority to EP Application No. 06014028.2, filed 6 Jul. 2006, the entire contents of each of which are hereby incorporated by reference.

The present invention relates to a two-component composition comprising a first component and a second component, wherein the first component being a non-aqueous resin composition comprising an unsaturated polyester resin or vinyl ester resin, and the second component comprising a peroxide compound. The two component compositions show good curing properties in the absence of cobalt and vanadium. The two component compositions also show slight gel-time drift tendency. In particular, the present invention relates to two-component unsaturated polyester resin or vinyl ester resin compositions for structural parts. The present invention also relates to a process for curing such two-component compositions.

As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc. Generally, resin compositions for structural parts are free of blowing agents.

As used herein, the term "two-component system" refers to systems where two separate components (A and B) are being spatially separated from each other, for instance in separate cartridges or the like, and is intended to include any system wherein each of such two separate components (A and B) may contain further separate components. The components are combined at the time the system is used.

As meant herein the term gel-time drift (for a specifically selected period of time, for instance 30 or 60 days) reflects the phenomenon, that—when curing is performed at another point of time than at the reference standard moment for curing, for instance 24 hours after preparation of the resin—the gel time observed is different from that at the point of reference. For unsaturated polyester resins, as can generally be cured under the influence of peroxides, gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known. The lower the gel-time drift is, the better predictable the behavior of the resin (and the resulting properties of the cured material) will be.

W. D. Cook et al., in Polym. Int. Vol. 50, 2001, at pages 129-134 describe in an interesting article various aspects of control of gel time and exotherm behavior during cure of unsaturated polyester resins. They also demonstrate how the exotherm behavior during cure of such resins can be followed. FIGS. 2 and 3 of this article show the gel times in the bottom parts of the exotherms measured. Because these authors focus on the exotherms as a whole, they also introduced some correction of the exotherms for heat loss. As can be seen from the figures, however, such correction for heat loss is not relevant for gel times below 100 minutes.

Gel time drift (hereinafter: "Gtd") can be expressed in a formula as follows:

$$Gtd = (T_{25 \to 35° C.} \text{ at } y\text{-days} - T_{25 \to 35° C.} \text{ after mixing}) / T_{25 \to 35° C.} \text{ after mixing} \times 100\% \quad \text{(formula 1)}$$

In this formula $T_{25 \to 35° C.}$ (which also might be represented by $T_{gel}$) represents, as mentioned above, the time lapsed in the curing phase of the resin to increase in temperature from 25° C. to 35° C. The additional reference to "at y days" shows after how many days of preparing the resin the curing is effected.

All polyester resins, by their nature, undergo some changes over time from their production till their actual curing. One of the characteristics where such changes become visible is the gel-time drift. The state of the art unsaturated polyester resin systems generally are being cured by means of initiation systems. In general, such unsaturated polyester resin systems are cured under the influence of peroxides and are accelerated (often even pre-accelerated) by the presence of metal compounds, especially cobalt salts, as accelerators. Cobalt naphthenate and cobalt octanoate are the most widely used accelerators. In addition to accelerators, the polyester resins usually also contain inhibitors for ensuring that the resin systems do not gellify prematurely (i.e. that they have a good storage stability). Furthermore, inhibitors are being used to ensure that the resin systems have an appropriate gel time and/or for adjusting the gel-time value of the resin system to an even more suitable value.

Most commonly, in the state of the art, polymerization initiation of unsaturated polyester resins, etc. by redox reactions involving peroxides, is accelerated or pre-accelerated by a cobalt compound in combination with another accelerator.

An excellent review article of M. Malik et al. in J. M. S.—Rev. Macromol. Chem. Phys., C40(2&3), p. 139-165 (2000) gives a good overview of the current status of resin systems. Curing is addressed in chapter 9. For discussion of control of gel time reference can be made to the article of Cook et al. as has been mentioned above. Said article, however, does not present any hint as to the problems of gel-time drift as are being solved according to the present invention.

The phenomenon of gel-time drift, indeed, so far got quite little attention in the literature. Most attention so far has been given in literature to aspects of acceleration of gel time in general, and to improving of pot-life or shelf life of resins. The latter aspects, however, are not necessarily correlated to aspects of gel-time drift, and so, the literature until now gives very little suggestions as to possible solutions for improvement of (i.e. lowering of) gel-time drift.

Accordingly, for the unsaturated polyester resins and vinyl ester resins as are part of the current state of the art there is still need for finding resin systems showing reduced gel-time drift tendency, or in other words, resin systems having only slight gel-time drift when cured with a peroxide. Preferably the mechanical properties of the resin composition after curing with a peroxide are unaffected (or improved) as a result of the changes in the resin composition for achieving the reduced gel-time drift. Moreover, for environmental reasons, the presence of cobalt in the resins is less preferred.

The present inventors now, surprisingly, found that unsaturated polyester resin or vinyl ester resin systems with good curing properties when cured with a peroxide, could be obtained by providing a two-component composition comprising a first component and a second component, wherein the first component being a non-aqueous resin composition comprising an unsaturated polyester resin or vinyl ester resin, a transition metal compound selected from a copper, iron, manganese or titanium compound, and a potassium compound, and the resin composition contains less than 0.01 mmol cobalt per kg primary resin system and less than 0.01 mmol vanadium per kg primary resin system; and the second component comprises a peroxide compound. According to the present invention, compositions having good curing properties can be obtained, i.e. the compositions according to the invention have short gel time, short peak time and/or high peak temperature. In the curing of unsaturated polyester resins or vinyl esters, gel time is a very important characteristic of the curing properties. In addition also the time from reaching the gel time to reaching peak temperature, and the level of the peak temperature (higher peak temperature generally results in better curing) are important. In addition, resins can be obtained which exhibit a reduced gel time drift tendency.

Furthermore the inventors have surprisingly found that besides the good curing characteristics also cured objects with low to very low amount of residuals like styrene and benzaldehyde can be obtained. In fact sometimes the amounts of residuals is below the detection limit.

Preferably, the cobalt concentration is lower than 0.001 mmol Co per kg primary resin system. Most preferably the resin composition is free of cobalt.

Preferably, the vanadium concentration is lower than 0.001 mmol V per kg primary resin system. Most preferably the resin composition is free of vanadium.

According to the present invention resin systems having good curing properties are obtained. In addition, the resin systems according to the present invention only show slight gel time drift tendency.

U.S. Pat. No. 4,175,064 discloses an accelerator composition for the curing of unsaturated polyester resin composition comprising a cobalt salt and a potassium salt of monocarboxylic acids. This document also teaches that the use of only potassium salt does not result in efficient curing. There is no teaching in U.S. Pat. No. 4,175,064 that potassium salts act as an accelerator for other transition metals. On the contrary, U.S. Pat. No. 5,310,826 teaches that K-ethylhexanoate acts as an inhibitor for thiol containing unsaturated polyester resin compositions. In addition, U.S. Pat. No. 4,829,106 teaches that both copper salts and potassium salts act as inhibitors for unsaturated polyester resins.

There is, however, no indication at all that a transition metal compound selected from a copper, iron, manganese or titanium compound in combination with a potassium compound can act as accelerator for the peroxide decomposition which is generally used as initiator for curing of unsaturated polyester or vinyl ester resin compositions.

The unsaturated polyester resin or vinyl ester resin as is comprised in the two component composition according to the present invention may suitably be selected from the unsaturated polyester resins or vinyl ester resin as are known to the skilled man. Examples of suitable unsaturated polyester or vinyl ester resins to be used as basic resin systems in the resins of the present invention are, subdivided in the categories as classified by Malik et al., cited above.

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

(5) Vinyl ester resins: these are resins, which are mostly used because of their because of their hydrolytic resistance and excellent mechanical properties, as well as for their low styrene emission, are having unsaturated sites only in the terminal position, introduced by reaction of epoxy resins (e.g. diglycidyl ether of bisphenol-A, epoxies of the phenol-novolac type, or epoxies based on tetrabromobisphenol-A) with (meth)acrylic acid. Instead of (meth)acrylic acid also (meth)acrylamide may be used.

Besides these classes of resins also so-called dicyclopentadiene (DCPD) resins can be distinguished as unsaturated polyester resins. As used herein, a vinyl ester resin is a (meth) acrylate functional resin. Besides the vinyl ester resins as described in Malik et al., also the class of vinyl ester urethane resins (also referred to urethane methacylate resins) can be distinguished as vinyl ester resins. Preferably, the vinyl ester resin used in the present invention is a resin that is obtained by the esterification of an epoxy resin with a (meth)acrylic acid or a (meth)acrylamide.

All of these resins, as can suitably used in the context of the present invention, may be modified according to methods known to the skilled man, e.g. for achieving lower acid number, hydroxyl number or anhydride number, or for becoming more flexible due to insertion of flexible units in the backbone, etc. The class of DCPD-resins is obtained either by modification of any of the above resin types by Diels-Alder reaction with cyclopentadiene, or they are obtained alternatively by first reacting maleic acid with dicyclopentadiene, followed by the resin manufacture as shown above.

Of course, also other reactive groups curable by reaction with peroxides may be present in the resins, for instance reactive groups derived from itaconic acid, citraconic acid and allylic groups, etc. Accordingly, the unsaturated polyester resins or vinyl ester resins used in the present invention may contain solvents. The solvents may be inert to the resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam.

The unsaturated polyester resins and vinyl ester resins as are being used in the context of the present invention may be any type of such resins, but preferably are chosen from the group of DCPD-resins, iso-phthalic resins and ortho-phthalic resins and vinyl ester resins. More detailed examples of resins belonging to such groups of resins have been shown in the foregoing part of the specification. More preferably, the resin is an unsaturated polyester resin preferably chosen from the group of DCPD-resins, iso-phthalic resins and ortho-phthalic resins.

The resin composition of the two component composition according to the present invention preferably has an acid value in the range of from 0.001-300 mg KOH/g of resin composition. As used herein, the acid value of the resin composition is determined titrimetrically according to ISO 2114-2000.

Preferably, the molecular weight of the unsaturated polyester resin or vinyl ester resin is in the range of from 500 to 200.000 g/mole. As used herein, the molecular weight of the resin is determined using gel permeation chromatography according to ISO 13885-1.

In a preferred embodiment, the resin is an unsaturated polyester resin.

The resin composition of the two component composition according to the present invention comprises a dissolved transition metal compound as accelerator. The transition metal compound is selected from a copper, iron, manganese or titanium compound.

In one embodiment of the present invention, the transition metal compound is a copper compound. In the context of the invention all kinds of copper compounds can be used as copper accelerator compound. According to the invention, the copper accelerator compound present in the resin composition is preferably a copper salt or complex. More preferably, the copper compound is a copper$^{2+}$ compound or a copper$^{2+}$ compound, more preferably a copper$^{2+}$ compound. The compound is preferably a copper$^{2+}$ salt or complex or a copper$^{2+}$ salt or complex. Even more preferably, the copper compound is a copper$^+$ salt or copper$^{2+}$ salt, more preferably a copper$^{2+}$ salt. In view of the solubility of the copper compound in the resin composition, the copper compound is preferably an organo soluble copper compound like for instance copper carboxylates, copper acetoacetates and copper chlorides. It will be clear that, instead of a single copper compound also a mixture of copper compounds can be used.

In one embodiment of the present invention, the transition metal compound is a iron compound. In the context of the invention all kinds of iron compounds can be used as iron accelerator compound. According to the invention, the iron accelerator compound is preferably an iron salt or complex. More preferably, the iron compound is an iron$^{2+}$ salt or complex or a iron$^{3+}$ salt or complex. Even more preferably, the iron compound is a iron$^{2+}$ salt or iron$^{3+}$ salt. The iron$^{2+}$ salt is preferably an organic iron$^{2+}$ salt. The iron$^{3+}$ salt is preferably an organic iron$^{3+}$ salt. The organic iron$^{2+}$ salt or the organic iron$^{3+}$ salt is preferably an iron carboxylate or an iron acetoacetate. It will be clear that, instead of a single iron compound also a mixture of iron compounds can be used.

In one embodiment of the present invention, the transition metal compound is a manganese compound. In the context of the invention all kinds of manganese compounds can be used as manganese accelerator compound. According to the invention, the manganese accelerator compound is preferably a manganese salt or complex. More preferably, the manganese compound is a manganese$^{2+}$ salt or complex or a manganese$^{3+}$ salt or complex. Even more preferably, the manganese compound is a manganese$^{2+}$ salt or manganese$^{3+}$ salt. The manganese$^{2+}$ salt is preferably an organic manganese$^{2+}$ salt. The manganese$^{3+}$ salt is preferably an organic manganese$^{3+}$ salt. The organic manganese$^{2+}$ salt or the organic manganese$^{3+}$ salt is preferably a manganese carboxylate or a manganese acetoacetate. It will be clear that, instead of a single manganese compound also a mixture of manganese compounds can be used.

In one embodiment of the present invention, the transition metal compound is a titanium compound. In the context of the invention all kinds of titanium compounds can be used as titanium accelerator compound. According to the invention, the titanium accelerator compound is preferably an organotitanium compound or a mixture of organotitanium compounds. The organotitanium compound is preferably a titanium alkoxide, preferably being a titanium propoxide or butoxide, or a titanium carboxylate. It will be clear that also mixtures of the above mentioned transition metals can be used.

The transition metal of the transition metal accelerator compound is preferably present in the resin composition of the two component composition according to the invention in an amount of at least 0.05 mmol per kg of primary resin system, preferably in an amount of at least 1 mmol per kg of primary resin system. The upper limit of the transition metal content is not very critical, although for reasons of cost efficiency of course no extremely high concentrations will be applied. Generally the concentration of the transition metal in the primary resin system will be lower than 50 mmol per kg of primary resin system, preferably lower than 20 mmol per kg of primary resin system. In a preferred embodiment, the transition metal is present in an amount of 0.05 to 50 mmol/kg of primary resin system, preferably in an amount of 1-20 mmol/ kg of primary resin system.

For understanding of the invention, and for proper assessment of the amounts of transition metal compound to be present in the resin composition, the term "primary resin system" as used herein is understood to mean the total weight of the resin, but excluding any fillers as may be used when applying the resin system for its intended uses. The primary resin system therefore consists of the unsaturated polyester resin or vinyl ester resin, any additives present therein (except for the peroxide component that is to be added shortly before the curing) soluble in the resin, such as accelerators, promoters, inhibitors, low-profile agents, colorants (dyes), thixotropic agents, release agents etc., as well as styrene and/or other solvents as may usually be present therein. The amount of additives soluble in the resin usually may be as from 1 to 25 wt. % of the primary resin system; the amount of styrene and/or other solvent may be as large as up to 50 wt. % of the primary resin system. The primary resin system, however, explicitly does not include compounds not being soluble therein, such as fillers (e.g. glass or carbon fibers), talc, clay, solid pigments (such as, for instance, titanium dioxide (titanium white)), flame retardants, e.g. aluminium oxide hydrates, etc.

The resin composition of the two component composition according to the invention contains a dissolved potassium compound as co-accelerator. The potassium co-accelerator compound is preferably a potassium oxide, hydroxide, carboxylate, carbonate or hydrocarbonate. More preferably, the potassium compound is potassium carboxylate, preferably a potassium $C_6$-$C_{20}$ carboxylate. In another preferred embodiment of the present invention, the potassium carboxylate is in-situ formed by adding potassium hydroxide to the resin composition.

Preferably, the amount of potassium is from 0.001 to 2000 mmol potassium/kg of primary resin system. More preferably, the amount of potassium is from 0.1 to 200 mmol potassium/kg of primary resin system. Even more preferably the amount of potassium is from 1-150 mmol/kg primary resin system and most preferably the amount of potassium is from 2-40 mmol/kg primary resin system.

Preferably, the molar ratio between the transition metal and the potassium is from 40:1 to 1:3000, more preferably from 25:1 to 1:100. The most preferred molar ratios will depend on the transition metal(s) used. The man skilled in the art can easily determine the optimal ratio depending on the transition metals used and the amount of potassium.

Besides potassium and the transition metal also other organic additives may be present like bases, thiols and/or 1,3-dioxo compounds.

In a preferred embodiment, the resin composition further comprises a base. Preferably, the base is an organic base with $pK_a \geq 10$. The organic base with $pK_a \geq 10$ is preferably a nitrogen containing compound. The nitrogen containing compound is preferably an amine. The amine preferably has the following formula:

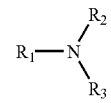

whereby $R^1$, $R^2$ and $R^3$ each individually may represent hydrogen (H), $C_1$-$C_{20}$ alkyl, $C_6$-$C_{20}$aryl, alkylaryl or arylalkyl group, that each optionally may contain one or more hetero-atoms (e.g. oxygen, phosphor or sulphur atoms) and/ or substituents and a ring may be present between $R_1$ and $R_2$, $R_2$ and $R_3$ and/or $R_1$ and $R_3$, which may contain heteroatoms. In a preferred embodiment, $R^1$, $R^2$ and $R^3$ each individually may represent hydrogen (H), $C_6$-$C_{20}$ alkyl, $C_6$-$C_{20}$ aryl, alkylaryl or arylalkyl group, that each optionally may contain one or more hetero-atoms (e.g. oxygen, phosphor or sulphur atoms) and/or substituents. In a more preferred embodiment, $R^1$, $R^2$ and $R^3$ are hydrogen. In another preferred embodiment, $R^1$, $R^2$ and $R^3$ each individually may represent a $C_1$-$C_{20}$ alkyl or a $C_6$-$C_{20}$ aryl group. In yet another preferred embodiment, at least one of $R^1$, $R^2$ and $R^3$ is an alkyl-O—$R^4$ group, whereby $R^4$ is hydrogen, a $C_1$-$C_{20}$ alkyl group or a ring is present between $R^4$ and at least one of the other R groups. In this preferred embodiment, the —O—$R^4$ group is preferably in the 1-position with respect to the nitrogen atom.

Preferably, the amount of the base is from 0.05 to 5% by weight, calculated on the total weight of the primary resin system of the resin composition. More preferably, the amount of the base is from 0.1 to 2% by weight; even more preferably between 0.25 and 1% by weight.

Preferably, the molar amount between the transition metal and the basic functionality of the base is from 200:1 to 1:1500, more preferably from 3:1 to 1:100. The man skilled in the art can easily determine the optimal ratio depending on the transition metals and the amount of potassium used.

The 1,3-dioxo compound is preferably a compound having the following formula:

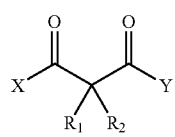

whereby
X,Y=H, $C_1$-$C_{20}$ alkyl, $C_6$-$C_{20}$aryl, alkylaryl, arylalkyl, part of a polymer chain, $OR^3$, $NR^3R^4$;
$R^1$, $R^2$, $R^3$, and $R^4$ each individually may represent hydrogen (H), or a $C_1$-$C_{20}$ alkyl, $C_6$-$C_{20}$ aryl, alkylaryl or arylalkyl group, that each optionally may contain one or more heteroatoms (e.g. oxygen, phosphor, nitrogen or sulphur atoms) and/or substituents; a ring may be present between $R^1$ and $R^2$, $R^1$ and $R^3$, and/or between $R^2$ and $R^4$; $R^3$ and/or $R^4$ may be part of a polymer chain, may be attached to a polymer chain or may contain a polymerizable group. Preferably, X and/or Y are/is $C_1$-$C_{20}$ alkyl and/or $C_6$-$C_{20}$ aryl. More preferably, X and/or Y are/is a methyl group. Preferably, the 1,3-dioxo compound is acetylacetone. The 1,3-dioxo compound may be a polymer or is polymerizable.

Preferably, the amount of the 1,3-dioxo compound is from 0.05 to 5% by weight, calculated on the total weight of the primary resin system of the resin composition. More preferably, amount of the 1,3-dioxo compound is from 0.5 to 2% by weight. The molar ratio between the transition metal and the dioxo compound is preferably from 10:1 to 1:5000, preferably 2:1 to 1:400. The man skilled in the art can easily determine the optimal ratio depending on the transition metals and the amount of dioxo compound used.

The thiol that may be present may come from all kinds of thiol-containing compounds. The thiol-containing compound is preferably an aliphatic thiol. The aliphatic thiol is preferably an α-mercapto acetate or β-mercapto propionate, or a derivative or mixture thereof. The thiol-functionality of the thiol-containing compound is preferably ≧2, more preferably ≧3. The molar ratio between the transition metal and the thiol groups of the thiol-containing compound is preferably from 10:1 to 1:1500, more preferably from 1:1 to 1:55. The man skilled in the art can easily determine the optimal ratio depending on the transition metals and the amount of potassium used.

Also combinations of the above described organic additives may be used.

The second component (B component) of the two-component system comprises a peroxide compound. The peroxide component can be any peroxide known to the skilled man for being used in curing of unsaturated polyester resins or vinyl ester resins. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc. The peroxides can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones, being an addition product of hydrogen peroxide and a ketone, such as, for instance, methyl ethyl ketone peroxide, methyl isobutyl ketone peroxide and acetylacetone peroxide), peroxyesters or peracids (such as, for instance, t-butyl peresters, benzoyl peroxide, peracetates and perbenzoates, lauryl peroxide, including (di)peroxyesters), -perethers (such as, for instance, peroxy diethyl ether). Often the organic peroxides used as curing agent are tertiary peresters—or tertiary hydroperoxides, i.e. peroxy compounds having tertiary carbon atoms directly united to an —OO-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule). In case a solid peroxide is being used for the curing, the peroxide is preferably benzoyl peroxide (BPO).

Most preferably, however, the peroxide is a liquid hydroperoxide. The liquid hydroperoxide, of course, also may be a mixture of hydroperoxides. Handling of liquid hydroperoxides when curing the resins for their final use is generally easier: they have better mixing properties and dissolve more quickly in the resin to be cured.

In particular it is preferred that the peroxide is selected from the group of ketone peroxides, a special class of hydroperoxides. The peroxide being most preferred in terms of handling properties and economics is methyl ethyl ketone peroxide (MEK peroxide).

In a preferred embodiment of the invention, the resin composition of the two component composition contains styrene, preferably in an amount of at least 5 weight %.

In a further preferred embodiment of the present invention, the resin composition also contains one or more radical inhibitors.

More preferably, the resin composition of the two component compositions according to the invention contain one or more radical inhibitors, preferably chosen from the group of phenolic compounds, stable radicals like galvinoxyl and N-oxyl based compounds, catechols and/or phenothiazines.

The amount of radical inhibitor as used in the context of the present invention, may, however, vary within rather wide ranges, and may be chosen as a first indication of the gel time as is desired to be achieved. Preferably, the amount of phenolic inhibitor is from about 0.001 to 35 mmol per kg of primary resin system, and more preferably it amounts to more than 0.01, most preferably more than 0.1 mmol per kg of primary resin system. The skilled man quite easily can assess, in dependence of the type of inhibitor selected, which amount thereof leads to good results according to the invention.

Suitable examples of radical inhibitors that can be used in the resin compositions of the two component compositions according to the invention are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

Advantageously, the amount of radical inhibitor in the resin composition of the two component composition according to the invention is in the range of from 0.0001 to 10% by weight, calculated on the total weight of the primary resin system of the resin composition. More preferably, the amount of radical inhibitor in the resin composition is in the range of from 0.001 to 1% by weight.

The two component compositions according to the present invention can be applied in all applications as are usual for such types of resins. In particular they can suitably used in closed mould applications, but they also can be applied in open mould applications. For closed mould applications it is especially important that the manufacturer of the closed mould products reliably can use the favorable (i.e. reduced) gel-time drift tendency of the resin compositions of the two component composition according to the invention. End segments where the unsaturated polyester resin or vinyl ester resin systems according to the present invention can be applied are also marine applications, chemical anchoring, roofing, construction, relining, pipes & tanks, flooring, windmill blades, etc. That is to say, the resin systems according to the invention can be used in all known uses of unsaturated polyester resins and vinyl ester resins.

The present invention further also relates to all such objects or structural parts as are being obtained when curing the two-component compositions according to the invention. These objects and structural parts have excellent mechanical properties.

The present invention also relates to a process for radically curing the two-component composition according to the invention. It has surprisingly been found that the combination of a transition metal compound as described above and the potassium compound accelerates the radically curing of the unsaturated polyester or vinyl ester with the peroxide. The curing is preferably effected at a temperature in the range of from −20 to +200° C., preferably in the range of from −20 to +100° C., and most preferably in the range of from −10 to +60° C. (so-called cold curing). The curing is preferably effected in the absence of cobalt and in the absence of vanadium.

The present invention further relates to a non-aqueous resin composition comprising an unsaturated polyester resin or vinyl ester resin, a transition metal compound selected from a copper, iron, manganese or titanium compound, and a potassium compound, and the resin composition contains less than 0.01 mmol cobalt per kg primary resin system and less than 0.01 mmol vanadium per kg primary resin system. Preferably, the resin composition is free of cobalt and vanadium. The unsaturated polyester resin or vinyl ester resin, the potassium, the transition metals and possible additives are described in detail in the foregoing parts of the specification, which description does not need to be repeated here.

The invention is now demonstrated by means of a series of examples and comparative examples. All examples are supportive of the scope of claims. The invention, however, is not restricted to the specific embodiments as shown in the examples.

EXPERIMENTAL PART

The resins used for curing are commercially available products products from DSM Composite Resins, Schaffhausen, Switzerland (except in case indicated differently) and in addition thereto also a resin—hereinafter referred to as Resin A—was specifically prepared on behalf of the inventors for being used in the tests. The peroxides used for curing are commercially available products from Akzo Nobel Inc. The transition metal compounds are added as solution in spirits, except for titanium. Copper is added as a copper naphtenate solution in spirits (8% copper); manganese is added as manganese ethyl hexanoate solution in spirits (10% manganese); iron is added as iron naphtenate solution in spirits (6% iron) and titanium is added as titanium(IV)-n-propoxide, unless otherwise indicated.

Preparation of Resin A 184.8 g of propylene glycol (PG), 135.8 g of diethylene glycol (DEG), 216.1 g of phthalic anhydride (PAN), 172.8 g of maleic anhydride (MAN), and 0.075 g 2-t-butylhydroquinone were charged in a vessel equipped with a reflux condenser, a temperature measurement device and inert gas inlet. The mixture was heated slowly by usual methods to 205° C. At 205° C. the mixture was kept under reduced pressure until the acid value reached a value below 16 mg KOH/g resin and the falling ball viscosity at 100° C. was below 50 dpa·s. Then the vacuum was relieved with inert gas, and the mixture was cooled down to 130° C., and thereafter the solid UP resin so obtained was transferred to a mixture of 355 g of styrene and 0.07 g of mono-t-butyl-hydroquinone and was dissolved at a temperature below 80° C. The final resin viscosity reached at 23° C. was 640 mPa·s, and the Non Volatile Matter content was 64.5 wt. %.

Monitoring of Curing

In most of the Examples and Comparative Examples presented hereinafter it is mentioned, that curing was monitored by means of standard gel time equipment. This is intended to mean that both the gel time ($T_{gel}$ or $T_{25\text{-}35°\ C.}$) and peak time ($T_{peak}$ or $T_{25\text{->}peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

For some of the Examples and Comparative Examples also the gel-time drift (Gtd) was calculated. This was done on the basis of the gel times determined at different dates of curing according to formula 1:

Gtd=($T_{25\text{->}35°\ C.}$ at y-days−$T_{25\text{->}35}$° C. after mixing)/$T_{25\text{->}35°\ C.}$ after mixing×100%     (formula 1)

with "y" indicating the number of days after mixing.

Examples 1a-1c and Comparative Experiments A-D

Several formulations of the A component were prepared using 90 g resin A, 10 g styrene, 1 g Koctanoate (15% in PEG) and 0.3 mmol transition metal. The formulations were stirred for 5 min after which the curing using 3% (relative to the primary resin system) Butanox M50 as the B component was monitored in the gel timer. The comparative experiments were performed similar however either the transition metal or the potassium was omitted from the recipe. The results are shown in table 1.

TABLE 1

| ex | K octanonate | transition metal | Tgel (min) | T peak (min) | peak temp (° C.) |
|---|---|---|---|---|---|
| 1a | yes | Cu | 3.8 | 10.7 | 185 |
| 1b | yes | Mn | 115 | 126 | 178 |
| 1c | yes | Fe | 24.2 | 47.1 | 45 |
| comp a | yes | N | >1200 | | |
| comp b | no | Cu | >1200 | | |
| comp c | no | Mn | >1200 | | |
| comp d | no | Fe | >1200 | | |

These results clearly indicate that both a transition metal as well as a potassium salt is required for an efficient curing.

Examples 2a-2o and Comparative Experiments E-J

Several formulations were prepared as the A component using 90 g resin A, 10 g styrene, 1 g Koctanoate (15% in PEG), various amounts of transition metal (as solutions in sprirts, except for titanium) and various amounts of organic ligands. The formulations were stirred for 5 min after which the curing using 3% (relative to the primary resin system) Butanox M50 as the B component was monitored in the gel timer. The comparative experiments were performed similar however the potassium was omitted from the recipe. The results are shown in table 2.

TABLE 2

| ex | K oct (g) | transition metal (mmol/kg resin) | organic ligand (g) | Tgel (min) | T peak (min) | Peak temp (° C.) |
|---|---|---|---|---|---|---|
| 2a | 1 | Ti (10) | acetyl acetone (2) | 22.3 | 49 | 135 |
| 2b | 1 | Mn (3) | ethyl acetoacetate (0.2) | 117.6 | 128.5 | 174 |
| 2c | 0.05 | Mn (1) | acetyl acetone (1) | 15.9 | 25.9 | 177 |
| 2d | 1 | Mn (0.1) | acetyl acetone (1) | 9.7 | 42.1 | 99 |
| 2e | 1 | Mn (10) | acetyl acetone (1) | 6.0 | 8.3 | 203 |
| 2f | 1 | Fe (3) | acetyl acetone (1) | 10.4 | 26.8 | 165 |
| 2g | 0.2 | Fe (3) | acetyl acetone (1) | 15.2 | 42.9 | 135 |
| 2h | 1 | Cu (3) | acetoacetanilide (1) | 2.2 | 5.2 | 195 |
| 2i | 1 | Mn (1) | PTMP (0.1) | 25.5 | 33.8 | 183 |
| 2j | 1 | Mn (1) | PTMP (0.01) | 32.1 | 39.7 | 180 |
| 2k | 0.1 | Mn (1) | PTMP (0.5) | 4.7 | 10.2 | 177 |
| 2l | 1 | Fe (3) | PTMP (0.25) | 4.4 | 23 | 149 |
| 2m | 0.05 | Fe (3) | PTMP (0.5) | 3.6 | 10.6 | 164 |
| 2n | 1 | Cu (3) | morpholine (0.2) | 10.6 | 17.7 | 184 |
| 2o | 0.2 | Cu (3) | diethyl ethanol amine (1) | 5.7 | 14.5 | 175 |
| comp e | 0 | Ti (10) | acetyl acetone (2) | 40 | 74 | 87 |
| comp f | 0 | Mn (3) | ethyl acetoacetate (0.2) | >360 | | |
| comp g | 0 | Fe (3) | acetyl acetone (1) | >360 | | |
| comp h | 0 | Cu (3) | acetoacetanilide (1) | 75 | 96 | 127 |
| comp I | 0 | Mn (1) | PTMP (0.1) | >1200 | | |
| comp j | 0 | Cu (3) | morpholine (0.2) | 25 | 35 | 160 |

PTMP = pentaerythritol tertrakis mercaptopropionate
These experiments clearly demonstrate the effectiveness of the cure system according to the invention even in combination with organic ligands.

Examples 3a-3d

Several formulations were prepared as the A component using 90 g resin A, 10 g styrene, 0.5 g Koctanoate, various amounts of transition metals (as solutions in sprirts). The formulations were stirred for 5 min after which the curing using 3% (relative to the primary resin system) Butanox M50 as the B component was monitored in the gel timer. The results are shown in table 3.

TABLE 3

| | Mn (mmol/kg) | Cu (mmol/kg) | Tgel (min) | T peak (min) | peak temp (° C.) |
|---|---|---|---|---|---|
| 3a | 3 | 3 | 18.2 | 26.5 | 169 |
| 3b | 3 | 1 | 25.5 | 33.2 | 186 |
| 3c | 1 | 3 | 5.5 | 9.6 | 189 |
| 3d | 1 | 1 | 42.5 | 51.6 | 181 |

These results indicate that potassium salt can be employed with a combination of transition metals.

Examples 4a-p

Several formulations were prepared as A component using 90 g resin A, 10 g styrene, 1 g Koctanoate (15% in PEG), various amounts of organic ligands, various amounts of transition metals (as solutions in sprirts). The formulations were stirred for 5 min after which the curing using 3% (relative to the primary resin system) of various peroxides as B component was monitored in the gel timer. The results are shown in table 4A.

TABLE 4A

| | transition metal (mmol/kg) | Organic ligand (%) | peroxide | Tgel (min) | T peak (min) | Peak temp (° C.) |
|---|---|---|---|---|---|---|
| 4a | Mn (1) | acetylacetone (1) | Butanox M50 | 5.9 | 11.6 | 189 |
| 4b | Mn (1) | acetylacetone (1) | Trigonox 44B | 11.6 | 58.7 | 84 |
| 4c | Mn (1) | acetylacetone (1) | Cycloxox LE50 | 4.8 | 10 | 183 |
| 4d | Fe (3) | acetylacetone (1) | Butanox M50 | 10.4 | 26.8 | 165 |
| 4e | Fe (3) | acetylacetone (1) | Trigonox 44B | 9.4 | 23.2 | 51 |
| 4f | Fe (3) | acetylacetone (1) | Cyclonox LE50 | 7.6 | 23.3 | 151 |
| 4g | Fe (3) | acetylacetone (1) | H2O2 | 26 | 89 | 51 |
| 4h | Cu (3) | None | Butanox M50 | 5.3 | 11.3 | 189 |
| 4i | Cu (3) | None | Trigonox 44B | 7.3 | 13.6 | 17.4 |
| 4j | Cu (3) | None | Cyclonox LE50 | 4.4 | 9.4 | 177 |
| 4k | Cu (3) | None | H2O2 | 4.2 | 47.4 | 131 |
| 4l | Mn (1) | PTMP (0.5) | Butanox M50 | 10.4 | 18 | 156 |
| 4m | Mn (1) | PTMP (0.5) | Cyclonox LE50 | 9.2 | 16.5 | 144 |
| 4n | Fe (3) | PTMP (0.5) | Trigonox 21 | 81 | 113 | 123 |
| 4o | Cu (3) | DMEA (1) | Perkadox 50L | 48 | 54 | 124 |
| 4p | Cu (3) | DMEA (1) | Trigonox C | 197 | 217 | 154 |

DMEA = N,N-dimethyl ethanol amine

Examples 4q-t

Formulations for the A component according to the recipe above were prepared based on 100 g SR231 (a Vinyl ester resin from Cray Valley) instead of 90 g resin A and 10 g styrene. The results are shown in table 4B.

TABLE 4B

| Ex | transition metal (mmol/kg) | Organic ligand (%) | peroxide | Tgel (min) | T peak (min) | peak temp (° C.) |
|---|---|---|---|---|---|---|
| 4q | Mn (1) | acetylacetone (1) | Trigonox 44B | 3.2 | 7.2 | 196 |
| 4r | Mn (1) | Acetylacetone (1) | Trigonox AW70 | 20.2 | 28.5 | 193 |
| 4s | Mn (1) | Acetylacetone (1) | Trigonox 21 | 56 | 72 | 182 |
| 4t | Mn (1) | acetylacetone (1) | Perkadox 50L | 32.2 | 39.3 | 176 |

These results indicate that various peroxides as B components can be used with the potassium transition metal combination according to the invention in various types of resins as the A component Examples 5a-5u Formulations were prepared as the A component using 10 g resin, Koctanoate (15% in PEG) or KOH (50% in water), organic ligand, 0.008 g t-butylcatechol as inhibitor and a transition metal compound. The formulations were cured with 3% (relative to the primary resin system) Butanox M50 as B component and the cure was monitored in the geltimer. The results are shown in table 5.

TABLE 5

| resin | K | transition metal (mmol/kg) | organic ligand (%) | Tgel (min) | T peak (min) | peak temp (° C.) |
|---|---|---|---|---|---|---|
| 5a Palatal P4-01/styrene (90/10) | K-oct (0.5%) | Mn (1) | Acetyl acetone (0.5) | 132.7 | 159 | 126 |
| 5b Palatal P5-01/styrene (90/10) | K-oct (0.5%) | Mn (1) | Acetyl acetone (0.5) | 41.6 | 58.1 | 150 |
| 5c Palatal P6-01/styrene (90/10) | K-oct (0.5%) | Mn (1) | Acetyl acetone (0.5) | 28.4 | 40.3 | 185 |
| 5d Palatal P69-02 | K-oct (0.5%) | Mn (1) | Acetyl acetone (0.5) | 33.7 | 43.8 | 179 |
| 5e Synolite 8388-N-1/styrene (90/10) | K-oct (0.5%) | Mn (1) | Acetyl acetone (0.5) | 39.6 | 51.7 | 140 |
| 5f Daron XP45-A-2*,$ | K-oct in spirits (0.5%) | Mn (3.6) | | 63.6 | 71.5 | 150 |
| 5g A/styrene (90/10) | K-oct (0.5%) | Mn (1) | PTMP (0.5) | 7 | 12 | 171 |
| 5h Palatal P4-01/styrene (90/10) | K-oct (0.5%) | Mn (1) | | 22 | 38 | 139 |
| 5i Palatal P69-02 | K-oct (0.5%) | Mn (1) | PTMP (0.5) | 7 | 17 | 162 |
| 5j Synolite 8388-N-1/styrene (90/10) | K-oct (0.5%) | Mn (1) | PTMP (0.5) | 2 | 7 | 161 |
| 5k Daron XP45-A-2* | K-oct | Fe (3) | Acetyl acetone (1) | 81.8 | 98.5 | 152 |
| 5l Palatal P5-01/styrene (90/10)* | K-oct (0.5%) | Fe (3) | Acetyl acetone (1) | 13.4 | 32.3 | 143 |
| 5m A/styrene (90/10) | K-oct (1) | Cu (3) | | 41.6 | 52.6 | 168 |
| 5n Palatal P4-01/styrene (90/10) | K-oct (1) | Cu (3) | | 31.4 | 49.4 | 119 |
| 5o Palatal P5-01/styrene (90/10) | K-oct (1) | Cu (3) | | 42.6 | 67.2 | 113 |
| 5p Palatal P6-01/styrene (90/10) | K-oct (1%) | Cu (3) | | 6.5 | 11.5 | 192 |
| 5q Palatal P69-02 | K-oct (1) | Cu (3) | | 47.2 | 60.1 | 163 |
| 5r Synolite 8388-N-1/styrene (90/10) | K-oct (1) | Cu (3) | | 37 | 52.8 | 147 |
| 5s Daron XP45-A-2 | K-oct (1) | Cu (3) | | 37 | 52.8 | 147 |
| 5t A/styrene (90/10) | KOH (0.2) | Cu (3) | | 26.1 | 39.5 | 165 |
| 5u Daron XP45-A-2 | KOH (0.2) | Cu (3) | | 21.9 | 32.2 | 153 |

*no inhibitor used
$2% Butanox M50

These experiments clearly demonstrate that multiple resins like ortho esters, vinyl esters and DCPD resins can be used as resin in the A component. Furthermore these experiments show that the cure characteristics can be adjusted using inhibitors.

Examples 6a-c a) A formulation for the A component was prepared based on 200 g Daron XP45-, 0.289 Fe Naphtenate (12% Fe in spirits), 2 g K-octanoate (in PEG), 0.016 g t-butyl catechol and 2 g acetyl aceton. After stirring for 5 min the formulation was divided into 2 potions of 100 g each. The first portion of the A component was cured immediately with 3% (relative to the primary resin system) Butanox M50 as B component resulting in the following cure characteristics: $T_{gel}$=82, Tpeak=96, peak temp=152° C. The second portion of the A component was cured after 95 days of storage: Tgel=83, Tpeak=99, peak temp=149° C. resulting in a gel time drift of only 1% b) A formulation for the A component was prepared based on 180 g Palatal P 6-01, 20 g styrene, 0.48 g Cu Naphtenate (8% Cu in spirits), 0.4 g KOH (50% solution in water) and 0.016 g t-butyl catechol. After stirring for 5 min the formulation was divided into 2 potions of 100 g each. The first portion of the A component was cured immediately with 3% (relative to the primary resin system) Butanox M50 as B component resulting in the following cure characteristics: Tgel=57, Tpeak=67, peak temp=168° C. The second portion of the A component was cured after 95 days of storage: Tgel=54, Tpeak=61, peak temp=165° C. resulting in a gel time drift of only −6%.

c) A formulation of the A component was prepared based on 180 g Palatal P 4-01, 20 g styrene, 0.09 g Mn ethylhexanoate (6% Mn in sprits), 2 g K-octanoate (in PEG), 0.016 g t-butyl catechol and 2 g acetyl aceton. After stirring for 5 min the formulation was divided into 2 potions of 10 g each. The first portion of the A component was cured immediately with 3% (relative to the primary resin system) Butanox M50 as the B component resulting in the following cure characteristics: Tgel=132, Tpeak=159, peak temp=126° C. The second portion of the A component was cured after 186 days of storage: Tgel=125, Tpeak=150, peak temp=126° C. resulting in a gel time drift of only −6%

For comparison the drifts of cobalt based system based on 180 g Palatal P 6-01 and P 4-01, 20 g styrene, 0.4 g Co ethylhexanoate (10% in spirits) and 0.016 g t-butylcatechol are 158 and 384% after 171 days.

These results indicate that gel time drift free resin compositions can be obtained using the cure system according to the invention.

Examples 7a-7l 4 mm castings were prepared based on 500 g resin A according to the formulations described below (all amounts are in grams) as the A component and cured with Butanox M50 as the B component. The 4 mm castings were made between hardened borosilicate glass that was separated with a 4 mm EPDM U-shaped rim The casting were released and post cured during 24 hrs at 60° C. and 24 hrs at 80° C. Mechanical properties of the cured objects were determined according to ISO 527-2. The Heat Distortion Temperature (HDT) was measured according to ISO 75-Ae. Residual styrene contents were measured by gaschromatography using GC-FID (Gas Chromatography with a Flame Ionization Detector), using butylbenzene as an internal standard, after extraction of the cured objects in dichloromethane for 48 hrs. The results are shown in the next table.

TABLE 6

| | \multicolumn{12}{c}{Example} | | | | | | | | | | | |
|---|---|---|---|---|---|---|---|---|---|---|---|---|
| | 7a | 7b | 7c | 7d | 7e | 7f | 7g | 7h | 7i | 7j | 7k | 7l |
| A component | | | | | | | | | | | | |
| resin A | 500 | 500 | 500 | 500 | 500 | 500 | 500 | 500 | 500 | 500 | 500 | 500 |
| K naphtenate in spirits (10% K) | 2.5 | 5 | 5 | 2.26 | 0.5 | 0.5 | | 2.5 | 2.5 | 2.5 | 2.5 | 2.5 |
| KOH (50% in water) | | | | | | | 0.32 | | | | | |
| Nuodex Mn (10% Mn) | 1.5 | 0.27 | | | | | | 0.15 | 0.15 | 1.5 | | |
| Nuodex Fe (6%) | | | 1.4 | 1.4 | | | | | | | | |
| Cu Naphtenate (8% Cu) | | | | 0.5 | 0.5 | 0.52 | 0.2 | | | | 0.67 | 0.67 |
| Acetyl acetone | 2.5 | | | | | | | | 2.5 | | | |
| PTMP | | 0.5 | 0.25 | | 1 | | | | | | | |
| Aceto acetamide | | | | 1 | | | | | | | | |
| AAEMA | | | | | | | | | | 5.4 | | |
| t-butyl catechol | | 0.03 | | | | | | | | | | 0.03 |
| B component | | | | | | | | | | | | |
| Butanox M50 | 10 | 10 | 10 | 10 | 10 | 10 | 10 | 10 | 10 | 10 | 5 | 5 |
| HDT (° C.) | 74 | 71 | 67 | 69 | 71 | 71 | 71 | 69 | 67 | 70 | 72 | 72 |
| Tensile strenght (Mpa) | 58 | 52 | 57 | 64 | 52 | 65 | 35 | 62 | 77 | 69 | 91 | 85 |
| Emodulus (Gpa) | 3.6 | 3.7 | 3.5 | 3.6 | 3.9 | 3.8 | 3.9 | 3.8 | 3.7 | 3.7 | 3.8 | 3.7 |
| Elongation at break % | 1.8 | 1.6 | 1.8 | 2.1 | 1.6 | 2 | 0.9 | 1.8 | 3.1 | 2.2 | 5 | 3.7 |
| rest styrene % | <0.1 | <0.1 | <0.1 | <0.1 | <0.1 | <0.1 | <0.1 | <0.1 | <0.1 | <0.1 | <0.1 | <0.1 |
| Barcol hardness | 44 | 43 | 45 | 43 | 45 | 44 | 45 | 41 | 40 | 41 | 45 | 43 |

PTMP = pentaerythritol tetrakis mercapto propionate
AAEMA = acetoacetoxy ethyl methacrylate These castings results further indicate that the cure system according to the invention can be used for construction purposes.

Examples 8a-8 h and Comparative Experiments K-L 4 mm castings were prepared as described above, based on 500 g resin as the A component, and cured according to the formulations described below in which all amounts are in grams. The castings were post-cured for 16 hrs at 40° C. Mechanical properties of the cured objects were determined according to ISO 527-2. The Heat Distortion Temperature (HDT) was measured according to ISO 75-Ae. Residual styrene and benzaldehyde contents were measured by gaschromatography using GC-FID (Gas Chromatography with a Flame Ionization Detector), using butylbenzene as an internal standard, after extraction of the cured objects in dichloromethane for 48 hrs.

TABLE 7

| | 8a | 8b | 8c | 8d | Comp. K | 8e | 8f | 8g | 8h | Comp L |
|---|---|---|---|---|---|---|---|---|---|---|
| Resin | Palatal P4-01 | Palatal P4-01 | Palatal P4-01 | Palatal P4-01 | Palatal P4-01 | Synolite 8388-N-1 | Synolite 8388-N-1 | Synolite 8388-N-1 | Synolite 8388-N-1 | Synolite 8388-N-1 |
| Co solution (10% Co) | | | | | 0.27 | | | | | 0.27 |
| Nuodex Mn-10 | 0.83 | 1.48 | 2.17 | 1.63 | | 0.79 | 1.53 | 2.07 | 1.55 | |
| acetylacetone | 4.99 | 5.11 | | | | 5.1 | 5 | | | |
| K solution (10% K) | 5 | 5.01 | 2.55 | 5.15 | | 5.1 | 5.02 | 2.87 | 5.05 | |
| 4-SH | | | 2.61 | 1.01 | | | | 2.58 | 0.96 | |
| Butanox M50 | 10 | 10 | 10 | 10 | 10 | 10 | 10 | 10 | 10 | 10 |
| HDT (° C.) | 54.6 | 54.5 | 53.2 | 56.1 | 53.5 | 66.6 | 68 | 66 | 66.4 | 62 |
| Tens Str MPa | 60 | 60 | 58 | 65 | 70 | 49 | 43 | 47 | 65 | 63 |
| E-mod MPa | 3755 | 3666 | 4001 | 3968 | 4077 | 3805 | 3585 | 3641 | 3913 | 3645 |
| E at break (%) | 1.8 | 1.9 | 1.7 | 1.9 | 2.0 | 1.4 | 1.2 | 1.3 | 1.9 | 2.1 |
| Residual styrene (%) | <0.01 | <0.01 | 1.0 | 0.4 | 1.2 | <0.01 | <0.01 | 1.0 | 0.3 | 1.75 |
| Residual benzaldehyde (%) | <0.01 | <0.01 | 0.025 | 0.03 | 0.07 | <0.01 | <0.01 | 0.03 | 0.02 | 0.07 |

These results clearly indicate that castings can be prepared with comparable or even better mechanical properties and surprisingly very low rest styrene and rest benzaldehyde amounts sometimes even below the detection limit. This is very advantageous in view of lower emissions of these compounds to the environment.

Examples 9a-9c and Comparative Experiments M-N 4 mm castings were prepared as described above, based on 500 g resin as the A component, and cured according to the formulations described below in which all amounts are in grams. The castings were post-cured for 16 hrs at 40° C. Mechanical properties of the cured objects were determined according to ISO 527-2. The Heat Distortion Temperature (HDT) was measured according to ISO 75-A Residual styrene and benzaldehyde contents were measured by gaschromatography using GC-FID (Gas Chromatography with a Flame Ionization Detector), using butylbenzene as an internal standard, after extraction of the cured objects in dichloromethane for 48 hrs.

TABLE 8

|  | Comp M | 9a | Comp N | 9b | 9c |
| --- | --- | --- | --- | --- | --- |
| Palatal P 4-01 | 500.00 | 500.00 |  |  |  |
| Syn 8388-N-1 |  |  | 500.00 | 500.00 | 500.00 |
| Cobalt-2-ethylhexanoate 10% Co | 0.27 |  | 0.27 |  |  |
| Potassium-2-ethylhexanoate 10% K |  | 5.00 |  | 5.07 | 3.99 |
| Coppernaphthenate 8% Cu |  | 1.23 |  | 1.02 | 1.04 |
| N,N-Diethylacetoacetamide |  | 5.00 |  | 5.16 | 4.01 |
| Butanox M50 | 10 | 10 | 10 | 10 | 10 |
| HDT (° C.) | 53.5 | 56.1 | 62.0 | 68.0 | 68.1 |
| Tens. Str. (Mpa) | 70 | 53 | 63 | 48 | 68 |
| E-Modulus (Mpa) | 4077 | 4007 | 3645 | 3694 | 3868 |
| Elong. at break (%) | 2.0 | 1.4 | 2.1 | 1.4 | 2.0 |
| Residual styrene (%) | 1.2 | <0.01 | 1.8 | 0.1 | 0.5 |
| Residual benzaldehyde (%) | 0.1 | <0.01 | 0.1 | <0.01 | <0.01 |

These results clearly indicate that castings can be prepared with comparable mechanical properties and surprisingly very low rest styrene and rest benzaldehyde amounts i.e. sometimes below the detection limit. This is advantageous in view of lower emissions of these compounds to the environment.

Example 10 and Comparative Experiments O-P

To 100 grams of Palatal P 4-01 amounts of different bases have been added as listed in Table below, amounts are in grams. Reactivity was measured and 2- and 4 mm castings were made. The 2 mm castings were cured in an open mould with the top side in contact with air. The 4 mm castings were made between hardened borosilicate glass that was separated with a 4 mm EPDM U-shaped rim. After 24 hrs at 20° C. part of the material was post-cured.

TABLE 9

|  | 10a | Comp O | Comp P |
| --- | --- | --- | --- |
| Potassium-2-ethylhexanoate K 10% | 1.000 |  |  |
| N,N-Diethylacetoacetamide | 1 | 1 |  |
| Coppernaphtenate Cu 8% | 0.27 | 0.27 |  |
| p-tert-butylcatechol (ppm) | 419 |  |  |
| Cobalt-2-ethylhexanoate (Co 10%) |  |  | 1.5 |
| Butanox M-50 | 2 | 2 | 2 |
| Gel time (min) | 21.2 | 93.6 | 6.4 |
| Peak time (min) | 27 | 123 | 19.2 |
| Peakexotherm (° C.) | 110 | 90 | 136 |
| Barcol hardness casting 2 mm after 7 days Bottomside | 32 | 25 | 33 |
| Barcol hardness casting 2 mm after 7 days Topside | 42 | 35 | 38 |
| Barcol hardness casting 4 mm Post cured 16 hrs 40° C. | 45 | 42 | 45 |
| Rest styrene casting 4 mm post cured 16 hrs 40° C. (%) | 0.01 | 0.535 | 1.2 |
| Rest benzaldehyde casting 4 mm Post cured 16 hrs 40° C. (%) | <0.001 | 0.005 | 0.07 |

These results indicate that potassium in combination with another transition metal is required for a good curing combined with low amounts of residuals

Example 11

To a mixture of 100 grams of Palatal P 4-01 and 1 g diethylacetoacetamide, amounts of salts (in grams) as listed in the table were added. The reactivity was measured and 2 mm castings were made to measure Barcol hardness, tackiness and rest styrene and benzaldehyde.

TABLE 10

|  | 11a | 11b | 11c | 11d | 11e | 11f | 11g | 11h | 11i |
|---|---|---|---|---|---|---|---|---|---|
| Potassium-2-ethylhexanoate (%) | 1.03 | 1.02 | 1.01 | | | | | | |
| Potassium acetate (%) | | | | 1.03 | 1.00 | 1.01 | | | |
| Potassium hydroxide (%) | | | | | | | 1.05 | 1.01 | 1.00 |
| Copper(II)acetate (%) | 1.10 | | | 1.08 | | | 1.06 | | |
| Copper(II)hydroxide (%) | | 1.05 | | | 1.05 | | | 1.06 | |
| Copper(II)naphthenate (%) | | | 0.25 | | | 0.28 | | | 0.27 |
| Gel time (min) | 8.7 | 8.7 | 6.5 | 8.6 | 9.8 | 7.6 | 7.9 | 9.3 | 8.5 |
| Peak time (min) | 12.6 | 12.7 | 11.2 | 12.5 | 14.1 | 12.6 | 11.9 | 13.6 | 13.5 |
| Peak temperature (° C.) | 119 | 123 | 117 | 120 | 124 | 116 | 123 | 123 | 114 |
| Tackiness | None | none | none | none | none | none | none | none | none |
| Barcol bottom side | 40 | 37 | 37 | 42 | 38 | 40 | 40 | 33 | 50 |
| Barcol top side | 30 | 30 | 33 | 36 | 30 | 33 | 32 | 40 | 45 |
| Rest styrene (%) | 0.62 | 0.75 | 0.61 | 0.61 | 0.68 | 0.44 | 0.53 | 0.5 | 0.395 |
| Rest benzaldehyde (%) | <0.001 | <0.001 | <0.001 | <0.001 | <0.001 | <0.001 | <0.001 | <0.001 | <0.001 |

From these results it is clear that various types of potassium salt as well as various types of copper salts can be selected.

Example 12

The evaluation of the storage stability of the formulations according to the invention was performed based on 100 g Palatal P 4-01. The stability was tested in a test tube in an oil bath at 120° C. open to air and in a closed 100 ml jar in an oven at 80° C. The amounts below are in g.

TABLE 11

|  | 12a | 12b | Comp Q | Comp R |
|---|---|---|---|---|
| Potassium-2-ethylhexanoate solution (K 10%) | 0.2913 | 0.9963 | | |
| Diethylacetoacetamide (%) | 0.3038 | 0.3250 | | |
| Copper(II)naphthenate (Cu 8%) | 0.2675 | 0.2663 | | |
| Cobalt-2-ethylhexanoate (Co 10%) | | | 0.1525 | |
| Stability at 120° C. (min.) | 330 | 305 | 315 | 213 |
| Stability at 80° C. (days) | 8-9 | 8-9 | 5 | 4 |

From these stability tests can be concluded that compared to both an unaccelerated resin as well as a cobalt pre-accelerated resin, the storage stability of the new potassium containing accelerator is good at 120° C. and surprisingly even better at 80° C. This result also indicates that very good storage stabilities can be obtained for storage at ambient temperatures.

Example 13

To 100 grams of Palatal P 4-01 the ingredients of the accelerator system have been dosed in two different ways: in example A, all ingredients were mixed thoroughly and left to stand at 20° C. for 1 day before they were added to the resin. In example B the components were added separately to the resin just before the reactivity was measured. All amounts are in grams.

TABLE 12

| Example | 13A | 13B |
|---|---|---|
| Potassium-2-ethylhexanoate solution (K 10%) | 1.0388 | 1.0390 |
| N,N-Diethylacetoacetamide (%) | 1.0225 | 1.0228 |

TABLE 12-continued

| Example | 13A | 13B |
|---|---|---|
| Copper(II)naphthenate solution (Cu 8%) | 0.2975 | 0.2978 |
| Dosing method | pre-mix | separate addition |
| Gel time (min.) | 6.0 | 5.7 |
| Peak time (min.) | 10.4 | 10.0 |
| Peak temperature (° C.) | 117 | 117 |

These experiments clearly demonstrate that the components of the cure system can be used as a pre-mixed accelerator solution which is added to the resin or can be dosed separately to the resin.

Example 14

To 100 grams of Palatal P 4-01 was added 1.0 g diethylacetaceamide, 1.0 g K octanoate solution, 0.27 g Cu naphtenate solution and x mg of various inhibitors. After stirring for 10 minutes the mixtures were cure with 2 g Butanox M50. The resulting cure characteristics are listed below in table.

TABLE 13

| | Hydroquinone | 2-methyl hydroquinone | 2-tert-butylhydroquinone | p-tert-butyl catechol | Geltijd (min) | Piektijd (min) | Exotherm ° C. |
|---|---|---|---|---|---|---|---|
| 14a | 31 | | | | 15.5 | 21.3 | 111 |
| 14b | | 31 | | | 14.9 | 20.5 | 111 |
| 14c | | | 30 | | 15.6 | 21.0 | 112 |
| 14d | | | | 0 | 5.1 | 9.3 | 116.2 |
| 14e | | | | 2 | 5.0 | 9.2 | 116.9 |
| 14f | | | | 8 | 6.3 | 10.8 | 116.1 |
| 14g | | | | 16 | 8.7 | 13.5 | 114.8 |
| 14h | | | | 32 | 14.9 | 20.3 | 112 |
| 14i | | | | 64 | 35.9 | 42.8 | 106.6 |
| 14j | | | | 110 | 134.8 | 140.4 | 94.7 |

These results clearly show that various inhibitors can be employed in the system according to the invention. In order to adjust the gel-time the amount can be varied, which is advantageous as various applications have various processing windows i.e. require different gel-times.

The invention claimed is:

1. A two-component composition comprising a first component and a second component, wherein the first component is a non-aqueous resin composition comprising an unsaturated polyester resin or vinyl ester resin,
   a. a transition metal compound selected from a copper, iron, manganese or titanium compound, and
   b. a potassium compound, wherein
   the resin composition contains less than 0.01 mmol cobalt per kg primary resin system and less than 0.01 mmol vanadium per kg primary resin system; and wherein
   the second component comprises a peroxide compound.

2. The two-component composition according to claim 1, wherein the resin composition further comprises styrene.

3. The two-component composition according to claim 1, wherein the resin is an unsaturated polyester resin.

4. The two-component composition according to claim 1, wherein the copper compound is a copper carboxylate or a copper acetoacetate.

5. The two-component composition according to claim 1, wherein the iron compound is an iron carboxylate or an iron acetoacetate.

6. The two-component composition according to claim 1, wherein the manganese compound is a manganese carboxylate or a manganese acetoacetate.

7. The two-component composition according to claim 1, wherein the titanium compound is a titanium alkoxide or a titanium carboxylate.

8. The two-component composition according to claim 1, wherein the transition metal is present in an amount of at least 0.05 mmol per kg of primary resin system.

9. The two-component composition according to claim 1, wherein the potassium compound is a potassium carboxylate.

10. The two-component composition according to claim 1, wherein the potassium is present in an amount of 0.001 to 2000 mmol/kg of primary resin system.

11. The two-component composition according to claim 1, wherein the transition metal is present in an amount of 0.05 to 50 mmol/kg of primary resin system.

12. The two-component composition according to claim 1, wherein a molar ratio between the transition metal and the potassium is from 40:1 to 1:3000.

13. The two-component composition according to claim 1, wherein the resin composition further comprises an organic base with $pK_a \geq 10$.

14. The two-component composition according to claim 1, wherein the resin composition further comprises a 1,3 dioxo compound according to formula (1):

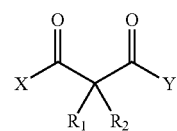

(1)

wherein X,Y = H, $C_1$-$C_{20}$ alkyl, $C_6$-$C_{20}$ aryl, alkylaryl, arylalkyl, part of a polymer chain, $OR^3$, $NR^3R^4$; $R^1$, $R^2$, $R^3$, and $R^4$ each individually may represent hydrogen (H), or a $C_1$-$C_{20}$ alkyl, $C_6$-$C_{20}$ aryl, alkylaryl or arylalkyl group, that each optionally may contain one or more heteroatoms (e.g. oxygen, phosphor, nitrogen or sulphur atoms) and/or substituents; a ring may be present between $R^1$ and $R^2$, $R^1$ and $R^3$, and/or between $R^2$ and $R^4$; $R^3$ and/or $R^4$ may be part of a polymer chain, may be attached to a polymer chain or may contain a polymerizable group.

15. The two-component composition according to claim 1, wherein the resin composition further comprises a thiol.

16. The two-component composition according to claim 1, wherein the resin composition further comprises a radical inhibitor.

17. The two-component composition according to claim 1, wherein the peroxide is selected from the group of hydroperoxides, perethers and perketones.

18. A non-aqueous resin composition comprising an unsaturated polyester resin or vinyl ester resin, a transition metal compound selected from a copper, iron, manganese or titanium compound, a potassium compound, wherein the resin composition is free of cobalt and vanadium.

19. A process for radically curing a resin composition, which process comprises radically curing the two-component composition according to claim 1.

20. The process according to claim 19, wherein curing is effected at a temperature in the range of from −20 to +200 ° C.

21. Cured objects or structural parts obtained from a two component composition according to claim 1.

22. Cured objects or structural parts obtained from a two component composition obtained by a process according to claim 19.

23. The two-component composition according to claim 10, wherein the potassium is present in an amount of 0.1-200 mmol/kg of primary resin system.

24. The two-component composition according to claim 11, wherein the transition metal is present in an amount of 1-20 mmol/kg of primary resin system.

25. The two-component composition according to claim 13, wherein the resin composition further comprises an amine having the following formula:

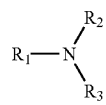

wherein $R^1$, $R^2$ and $R^3$ each individually may represent hydrogen (H), $C_1$-$C_{20}$ alkyl, $C_6$-$C_{20}$ aryl, alkylaryl or arylalkyl group, that each optionally may contain one or more hetero-atoms (e.g. oxygen, phosphor or sulphur atoms) and/or substituents.

26. The two-component composition according to claim 16, wherein the radical inhibitor is at least one selected from the group consisting of phenolic compounds, stable radicals, catechols and phenothiazines.

27. The two-component composition according to claim 17, wherein the peroxide is methylethylketone peroxide.

28. The process according to claim 20, wherein curing is effected at a temperature in the range of from −20 to +100° C.

29. The process according to claim 20, wherein curing is effected at a temperature in the range of from −10 to +60° C.

* * * * *